US012662570B2

(12) United States Patent
Hufen et al.

(10) Patent No.: US 12,662,570 B2
(45) Date of Patent: Jun. 23, 2026

(54) FLAME-RESISTANT POLYCARBONATE-POLYESTER BLEND

(71) Applicant: Covestro Intellectual Property GmbH & Co. KG, Leverkusen (DE)

(72) Inventors: Ralf Hufen, Duisburg (DE); Marius Nolte, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 824 days.

(21) Appl. No.: 17/775,349

(22) PCT Filed: Nov. 20, 2020

(86) PCT No.: PCT/EP2020/082798

§ 371 (c)(1),
(2) Date: May 9, 2022

(87) PCT Pub. No.: WO2021/105008

PCT Pub. Date: Jun. 3, 2021

(65) Prior Publication Data

US 2023/0020300 A1 Jan. 19, 2023

(30) Foreign Application Priority Data

Nov. 27, 2019 (EP) .................................... 19211919

(51) Int. Cl.

| | |
|---|---|
| ***C08G 64/06*** | (2006.01) |
| ***B29C 45/00*** | (2006.01) |
| ***C08F 220/14*** | (2006.01) |
| ***C08F 267/06*** | (2006.01) |
| ***C08F 283/12*** | (2006.01) |
| ***C08G 63/183*** | (2006.01) |
| ***C08G 77/442*** | (2006.01) |
| ***C08K 5/5399*** | (2006.01) |
| *B29K 69/00* | (2006.01) |
| *B29K 83/00* | (2006.01) |
| *B29K 267/00* | (2006.01) |

(52) U.S. Cl.

CPC .......... *C08G 64/06* (2013.01); *B29C 45/0001* (2013.01); *C08F 220/14* (2013.01); *C08F 267/06* (2013.01); *C08F 283/12* (2013.01); *C08G 63/183* (2013.01); *C08G 77/442* (2013.01); *C08K 5/5399* (2013.01); *B29K 2069/00* (2013.01); *B29K 2083/00* (2013.01); *B29K 2267/006* (2013.01)

(58) Field of Classification Search

CPC .... C08G 64/06; C08G 63/183; C08G 77/442; B29C 45/0001; C08F 220/14; C08F 267/06; C08F 283/12; C08K 5/5399; B29K 2069/00; B29K 2083/00; B29K 2267/006; C08L 69/005; C08L 69/00; C08L 51/085; C08L 67/02

See application file for complete search history.

(56) References Cited

U.S. PATENT DOCUMENTS

| | | | |
|---|---|---|---|
| 2,891,920 | A | 6/1959 | Hyde et al. |
| 3,294,725 | A | 12/1966 | Findlay et al. |
| 3,419,634 | A | 12/1968 | Vaughn, Jr. |
| 3,553,167 | A | 1/1971 | Hermann et al. |
| 3,692,744 | A | 9/1972 | Rene et al. |
| 4,075,173 | A | 2/1978 | Maruyama et al. |
| 4,269,964 | A | 5/1981 | Freitag et al. |
| 4,311,823 | A | 1/1982 | Mai et al. |
| 4,334,053 | A | 6/1982 | Freitag et al. |
| 4,584,360 | A | 4/1986 | Paul et al. |
| 4,806,593 | A | 2/1989 | Kress et al. |
| 4,877,831 | A | 10/1989 | Hongo et al. |
| 4,888,388 | A | 12/1989 | Hongo et al. |
| 5,807,914 | A | 9/1998 | Obayashi et al. |

(Continued)

FOREIGN PATENT DOCUMENTS

| | | | |
|---|---|---|---|
| CA | 1100681 | A | 5/1981 |
| CA | 1173998 | A | 9/1984 |

(Continued)

OTHER PUBLICATIONS

Envalior, "Pocan B1600 Datasheet," Envalior, Dec. 19, 2023, pp. 1-3 (Year: 2023).*
Jahani, "The Effect of Expoxy-Polyester Hybrid resin on Mechanical Properties, Rheological Behavior, and Water Absorption of Polypropylene Wood Flour Composites," 2007, Polymer Engineering and Science, pp. 2041-2048 (Year: 2007).*
Kolarik, "Temperature Dependence of Reinforcement in the Composites Polyurethane Rubber-Crosslinked Polymeric Filler," 1979, Journal of Applied Polymer Science, vol. 23, pp. 1553-1564. (Year: 1979).*
Philipp, "Polymeric Membrane Systems of Potential Use for Battery Separators," 1977, National Aeronautics and Space Administration, pp. 1-14 (Year: 1977).*
Kunststoff-Handbuch [Plastics Handbook], vol. VIII, p. 695 et seq., Carl-Hanser-Verlag, Munich 1973.

(Continued)

*Primary Examiner* — Robert S Jones, Jr.
*Assistant Examiner* — Joshua Caleb Bledsoe
(74) *Attorney, Agent, or Firm* — John E. Mrozinski, Jr.; Richard P. Bender

(57) ABSTRACT

The present invention relates to a molding compound containing A) 45 to 65 wt. % of at least one aromatic polycarbonate, polyester carbonate or mixtures thereof, B) 18 to 31 wt. % of at least one polybutylene terephthalate having rheological properties of 5 g/10 min to 30 g/10 min determined according to DIN EN ISO 1133 at 250° C. measuring temperature and a load of 2.16 kg, C) 3 to 10 wt % of at least one rubber-modified graft polymer with a graft base consisting of a silicone-acrylate composite rubber and a silicone rubber content of 20 to 60 wt. % relative to the graft base, D) 8 to 13 wt. % of at least one phosphazene, and E) 0 to 8.0 wt. % of at least one polymer additive, the weight ratio of components D to C) being in the range of 1.3:1 to 2.5:1. The invention also relates to a method for producing the molding compound, to the use of the molding compound for producing moldings and to the moldings as such.

9 Claims, No Drawings

(56) References Cited

U.S. PATENT DOCUMENTS

| | | | |
|---|---|---|---|
| 6,093,759 | A | 7/2000 | Gareiss et al. |
| 6,433,082 | B1 | 8/2002 | Eckel et al. |
| 6,740,695 | B1 | 5/2004 | Eckel et al. |
| 2008/0090961 | A1 | 4/2008 | Li et al. |
| 2008/0214731 | A1 | 9/2008 | Li |
| 2013/0131257 | A1 | 5/2013 | Sharma et al. |
| 2014/0086800 | A1 | 3/2014 | Yoon |
| 2015/0140300 | A1* | 5/2015 | Pudleiner ................ B32B 27/08 428/215 |
| 2015/0307707 | A1 | 10/2015 | Jung et al. |
| 2019/0077953 | A1* | 3/2019 | Jung ..................... C08L 69/005 |

FOREIGN PATENT DOCUMENTS

| | | | |
|---|---|---|---|
| DE | 2232877 | A1 | 1/1974 |
| DE | 3832396 | A1 | 2/1990 |
| EP | 0430134 | A2 | 6/1991 |
| EP | 0728811 | A2 | 8/1996 |
| EP | 2377899 | A1 | 10/2011 |
| GB | 776223 | A | 6/1957 |

OTHER PUBLICATIONS

W. Scholtan, H. Lange, Kolloid, Z. und Z. Polymere 250 (1972), pp. 782-796.

International Search Report, PCT/EP/2020/082798, date of mailing: Jan. 25, 2021, Authorized officer: Stephane Bezard.

Brent Strong, Plastics : materials and processing, 3rd ed. Pearson Education, Inc., Chapter 4, p. 144-p. 145, Upper Saddle River, New Jersey.

Bjorksten Research Laboratories, Inc., Polyesters and their Applications, Chapter IV. Fillers and Reinforcements, Reinhold Publishing Corporation, NY 1956.

* cited by examiner

FLAME-RESISTANT POLYCARBONATE-POLYESTER BLEND

CROSS REFERENCE TO RELATED APPLICATIONS

This application is a national stage application under 35 U.S.C. § 371 of PCT/EP2020/082798, filed Nov. 20, 2020, which claims benefit of European Application No. 19211919.6, filed Nov. 27, 2019, both of which are incorporated herein by reference in their entireties.

FIELD OF THE INVENTION

The present invention relates to a thermoplastic molding compound comprising polycarbonate and/or polyestercarbonate, polyester, impact modifier and flame retardant, to a process for producing the molded compound and to the use of the molding compound for production of molded articles, and to the molded articles produced.

BACKGROUND OF THE INVENTION

Thermoplastic polycarbonate or polyestercarbonate molding compounds and compositions thereof have been known for many years and are described in numerous documents. In the context of the present invention, the expression "polycarbonate molding compound" is used as an abbreviation, but this also means polyestercarbonate molding compounds and molding compounds comprising mixtures of polycarbonate and polyestercarbonate.

In polymer blends, the polycarbonate is mixed with at least one further thermoplastic and processed to give a molding compound. The choice of blending partners and further components, for example additives, can be used to vary the profile of properties of the molding compound and of the molded articles with regard to rheological, mechanical and thermal characteristics in many areas and match them to the demands of the respective application. For instance, the molding compounds are used to produce molded articles for the automotive sector, the construction sector and the electronics sector. To increase toughness, especially at low temperatures, blending partners having elastomeric properties are added to the polycarbonate as impact modifiers. Examples of rubber bases used include butadiene rubbers, acrylate rubbers and silicone rubbers.

There have also been descriptions of mixtures of different rubber types. For instance, US 2013/131257 A1 discloses a polycarbonate blend comprising polycarbonate, polyester and a graft polymer having a core of a silicone-acrylate composite rubber and a shell of alkyl (meth)acrylate and glycidyl methacrylate. The molding compound features improved chemical resistance, toughness, and thermal and physical properties.

In the case of polycarbonate molding compounds, as well as the improvement in toughness resulting from the impact modifier, there is often also a need for a certain flame retardancy, especially in the sector of electronics applications. For this purpose, flame retardants are used as a further component, frequently based on phosphorus compounds. In this case, phosphazenes have been found to be advantageous since they have a lower adverse effect on the distortion resistance than phosphates, for example.

US 2008/0214731 discloses a thermoplastic molding compound notable for its flame retardancy. The composition comprises aromatic poly(ester)carbonate with a weight-average molecular weight of at least 25000 g/mol, polyester rubber-modified graft polymer based on a silicone-acrylate composite rubber and a particular ratio of polyorganosiloxane/poly(meth)alkyl acrylate/graft shell, a phosphorus compound, fluorinated polyolefin and a boron compound having an average particle diameter of 2 to 10 μm.

WO 00/00542 discloses graft copolymers from bulk, solution or bulk suspension polymerization as components of thermoplastic molding compounds based on polycarbonate or polyestercarbonate, which also comprise a phosphazene compound and optionally fluorinated polyolefin and thermoplastic polymer. Thermoplastic molding compounds comprise aromatic polycarbonate and/or polyestercarbonate, graft copolymer of vinyl monomer onto a graft base having a glass transition temperature below 10° C., obtained by bulk, solution or bulk suspension polymerization, vinyl (co)polymers and/or polyalkylene terephthalates, (D) phosphazene and fluorinated polymers.

WO 00/00030 discloses molding compounds that are modified with phosphazenes and are based on polycarbonate and graft polymers with a graft base selected from the group of the silicone rubbers, EP(D)M rubbers and acrylate rubbers, which have excellent flame retardancy and very good mechanical properties such as stress-cracking resistance or notched impact resistance.

US 2014/086800 A1 discloses flame-retardant impact-modified polycarbonate molding compounds having a property combination of excellent mechanical properties, very good flame retardancy, high hydrolysis stability and high chemical stability, comprising aromatic polycarbonate and/or aromatic polyestercarbonate, rubber-modified graft polymer based on a silicone-acrylate composite rubber, at least one cyclic phosphazene, rubber-free vinyl (co)polymer or polyalkylene terephthalate, additives and anti-drip agents.

If the blending partner used for the polycarbonate is a polyester, the molding compound takes on a crystalline character that can be advantageous with regard to some properties. However, the achievement of good flame retardancy can be complicated further. Thus, the selection of suitable components and possible composition ranges is limited even further.

US 2008/0090961 A1 discloses a thermoplastic molding compound that features flame retardancy and impact resistance. The composition comprises aromatic poly(ester)carbonate, polyalkylene terephthalate, a rubber-modified graft polymer based on a silicone-acrylate composite rubber, a phosphorus compound and fluorinated polyolefin.

However, the polycarbonate-polyester blends disclosed in the prior art are still in need of improvement with regard to the combination of mechanical properties such as impact resistance and notched impact resistance, stiffness, melt flowability and flame retardancy. If the molded articles are used as housing materials, for example for medical equipment, a further demand is resistance to aggressive media that are used as detergents, for example in hospitals. Such detergents are, for example, solutions based on quaternary ammonium compounds and tertiary amines, and are commercially available as Hexaquart™ plus (BBraun).

For the polycarbonate blends described in the prior art, there is no disclosure of resistance to such media. But it is clear to the person skilled in the art that the chemical resistance of various materials on contact with different media is barely predictable. It is not possible to conclude that a material having good resistance to fats and oils, for example, will likewise have positive characteristics with respect to alcohols or ammonium and amine compounds. Even a material superior to another material on contact with a first medium can show unexpectedly worse characteristics when the medium is changed.

It was therefore desirable to provide a thermoplastic molding compound, in the case of which the molding compound and the molded articles produced therefrom are notable for an advantageous combination of mechanical properties, especially impact resistance and notched impact resistance, and stiffness, melt flowability and flame retardancy. For the production of thin component geometries, a stiffness of at least 2200 MPa (measured as tensile modulus of elasticity) is desirable. More preferably, the molded articles produced from the molding compound should additionally have good stability to cleaning compositions based on quaternary ammonium compounds and tertiary amines, as frequently used in the medical sector.

DETAILED DESCRIPTION OF THE INVENTION

It has been found that, surprisingly, a thermoplastic molding compound comprising

- A) 45% to 65% by weight, preferably 50% to 62% by weight, of at least one aromatic polycarbonate, polyestercarbonate or mixtures thereof,
- B) 18% by weight to 31% by weight, preferably 20% to 30% by weight, of at least one polybutylene terephthalate having a flowability of 5 g/10 min to 30 g/10 min, preferably 7 g/10 min to 20 g/10 min, in each case to DIN EN ISO 1133 at measurement temperature 250° C. and a load of 2.16 kg,
- C) 3% to 10% by weight, preferably 4% to 9% by weight, of at least one rubber-modified graft polymer having a graft base composed of a silicone-acrylate composite rubber and a silicone rubber content of 20% to 60% by weight, preferably 25% to 50% by weight, based in each case on the graft base,
- D) 8% to 13% by weight, preferably 9% to 12% by weight, of at least one phosphazene,
- E) 0% to 8.0% by weight, preferably 0.2% to 3% by weight, of at least one polymer additive, where the weight ratio of components D) to C) is in the range from 1.3:1 to 2.5:1, preferably 2:1 to 2.5:1, has the desired properties.

The molding compound preferably consists to an extent of at least 90% by weight, further preferably to an extent of at least 95% by weight, of components A to E. More preferably, the composition consists solely of components A to E.

Component A

Aromatic polycarbonates and/or aromatic polyestercarbonates of component A which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyestercarbonates, for example DE-A 3 007 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Another possibility is preparation by way of a melt polymerization process via reaction of diphenols with, for example, diphenyl carbonate.

Diphenols for the production of the aromatic polycarbonates and/or aromatic polyestercarbonates are preferably those of formula (I)

(I)

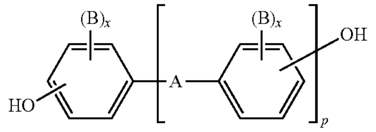

where

A is a single bond, $C_1$ to $C_5$-alkylene, $C_2$ to $C_5$-alkylidene, $C_5$ to $C_6$-cycloalkylidene, —O—, —SO—, —CO—, —S—, —$SO_2$—, $C_6$ to $C_{12}$-arylene, onto which further aromatic rings optionally containing heteroatoms may be fused, or a radical of formula (II) or (III)

(II)

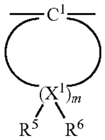

(III)

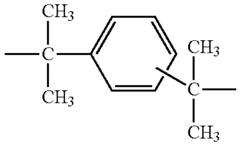

B in each case is $C_1$ to $C_{12}$-alkyl, preferably methyl, halogen, preferably chlorine and/or bromine, x in each case is independently 0, 1 or 2, p is 1 or 0, and $R^5$ and $R^6$ are individually choosable for each $X^1$ and are independently of one another hydrogen or $C_1$ to $C_6$-alkyl, preferably hydrogen, methyl or ethyl, X1 is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by processes known from the literature.

Examples of chain terminators suitable for the production of the thermoplastic aromatic polycarbonates include phenol, p-chlorophenol, p-tert-butylphenol or 2,4,6-tribromophenol, and also long-chain alkylphenols such as 4[2-(2,4,4-trimethylpentyl)]phenol, 4-(1,3-tetramethylbutyl)phenol according to DE-A 2 842 005 and monoalkylphenol or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol % based on the molar sum of the diphenols used in each case.

The thermoplastic aromatic polycarbonates have average molecular weights (weight-average $M_w$, measured by GPC (gel permeation chromatography) using a polycarbonate standard based on bisphenol A) of preferably 20 000 to 40 000 g/mol, further preferably 24 000 to 35 000 g/mol, especially preferably 28 000 to 33 000 g/mol. The preferred ranges result in a particularly advantageous balance of mechanical and rheological properties in the compositions of the invention.

The thermoplastic aromatic polycarbonates may be branched in a known manner, and preferably through incorporation of 0.05 to 2.0 mol %, based on the sum total of the diphenols used, of trifunctional or more than trifunctional compounds, for example those having three or more phenolic groups. Preference is given to using linear polycarbonates, more preferably based on bisphenol A.

Both homopolycarbonates and copolycarbonates are suitable. Copolymers of the invention as per component A can also be prepared using 1% to 25% by weight, preferably 2.5% to 25% by weight, based on the total amount of diphenols to be used, of polydiorganosiloxanes having hydroxyaryloxy end groups. These are known (U.S. Pat. No. 3,419,634) and may be produced by processes known from the literature. Likewise suitable are polydiorganosiloxane-containing copolycarbonates; the preparation of polydiorganosiloxane-containing copolycarbonates is described in DE-A 3 334 782 for example.

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio between 1:20 and 20:1.

In the preparation of polyestercarbonates, a carbonyl halide, preferably phosgene, is also additionally used as a bifunctional acid derivative.

Useful chain terminators for the preparation of the aromatic polyestercarbonates include, apart from the monophenols already mentioned, the chlorocarbonic esters thereof and the acid chlorides of aromatic monocarboxylic acids, which may optionally be substituted by $C_1$ to $C_{22}$-alkyl groups or by halogen atoms, and aliphatic $C_2$ to $C_{22}$-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

One or more aromatic hydroxycarboxylic acids may also be used in the production of aromatic polyestercarbonates.

The aromatic polyestercarbonates may be either linear or branched in a known manner (see DE-A 2 940 024 and DE-A 3 007 934), preference being given to linear polyestercarbonates.

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5 -methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may be varied as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

Preference is given to using polycarbonate based on bisphenol A as component A.

Component B

According to the invention, a polybutylene terephthalate or a mixture of polybutylene terephthalates is used as component B. A customary designation is PBT.

In a preferred embodiment, they are reaction products of terephthalic acid or reactive derivatives thereof, such as dimethyl esters or anhydrides, and butane-1,4-diol and also mixtures of these reaction products.

The polybutylene terephthalates thus contain structural units derived from terephthalic acid and butane-1,4-diol.

Polybutylene terephthalates in the context of the present invention should also be understood to include those polyesters containing not only terephthalic acid radicals but also proportions of further aromatic, aliphatic or cycloaliphatic dicarboxylic acids at up to 50 mol %, preferably up to 25 mol %. These may contain, for example, aromatic or cycloaliphatic dicarboxylic acids having 8 to 14 carbon atoms or aliphatic dicarboxylic acids having 4 to 12 carbon atoms, for example phthalic acid, isophthalic acid, naphthalene-2,6-dicarboxylic acid, 4,4'-biphenyldicarboxylic acid, succinic acid, adipic acid and cyclohexanedicarboxylic acid. Preference is given to using solely terephthalic acid and isophthalic acid.

The diol used is butane-1,4-diol.

The polybutylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744 B. Examples of preferred branching agents are trimesic acid, trimellitic acid, trimethylolethane and trimethylolpropane, and pentaerythritol.

The polybutylene terephthalates used have a flowability, measured as mass flow rate (MFR), of 5 g/10 min to 30 g/10 min, preferably of 7 g/10 min to 20 g/10 min, more preferably of 9 g/10 min to 15 g/10 min, determined in each case at measurement temperature 250° C. and a load of 2.16 kg. Measurement is effected according to DIN EN ISO 1133 (2012 version).

An example of a suitable polybutylene terephthalate is Pocan™ B1600 (Lanxess, Germany).

The polybutylene terephthalates having the flowability achieve an advantageous balance of mechanical and rheological properties in the compositions of the invention.

The polybutylene terephthalates can be prepared by known methods (see, for example, Kunststoff-Handbuch [Plastics Handbook], volume VIII, p. 695 et seq., Carl-Hanser-Verlag, Munich 1973).

Component C

Component C comprises rubber-modified graft polymers. These graft polymers comprise C.1 5% to 95% by weight, preferably 7% to 50% by weight, more preferably 8% to 20% by weight, based on component C, of at least one vinyl monomer on C.2 95% to 5% by weight, preferably 93% to 50% by weight, more preferably 92% to 80% by weight, based on component C, of one or more rubber-like graft bases based on silicone-acrylate composite rubber.

The vinyl monomers are used to form polymer chains and these are chemically bonded to the graft base C.2.

The graft bases have glass transition temperatures of <10° C., preferably <0° C., more preferably <−20° C.

The glass transition temperature is measured by means of dynamic differential calorimetry (DSC) to the standard DIN EN 61006 at a heating rate of 10 K/min, with definition of the $T_g$ as the midpoint temperature (tangent method).

The graft base C.2 generally has a median particle size ($d_{50}$) of 0.05 to 10 μm, preferably 0.1 to 2 μm, more preferably 0.1 to 0.5 μm.

The median particle size $d_{50}$ is the diameter with 50% by weight of the particles above it and 50% by weight of the particles below it. It can be determined by means of ultracentrifuge measurement (W. Scholtan, H. Lange, Kolloid, Z. and Z. Polymere 250 (1972), 782-1796).

Monomers C.1 are preferably mixtures of

C.1.1 50 to 99, preferably 60 to 80, especially 70 to 80 parts by weight, based on C.1, of vinylaromatics and/or ring-substituted vinylaromatics (such as styrene, α-methylstyrene, p-methylstyrene, p-chlorostyrene) and/or ($C_1$-$C_8$)-alkyl methacrylates, such as methyl methacrylate, ethyl methacrylate, and C.1.2 1 to 50, preferably 20 to 40, especially 20 to 30 parts by weight, based on C.1, of vinyl cyanides (unsaturated nitriles such as acrylonitrile and methacrylonitrile) and/or ($C_1$-$C_8$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate. Particularly preferred monomers are C.1.1 styrene and C.1.2 acrylonitrile or C.1.1=C.1.2 methyl methacrylate. Most preferred is methyl methacrylate.

The graft copolymers C are produced by free-radical polymerization, for example by emulsion, suspension, solution or bulk polymerization, preferably by emulsion or bulk polymerization, in particular by emulsion polymerization.

The gel content of the graft base C.2 is at least 30% by weight, preferably at least 40% by weight, especially at least 60% by weight, based in each case on C.2 and measured as insoluble fraction in toluene.

The gel content of the graft base C.2 is determined at 25° C. in a suitable solvent as the content insoluble in these solvents (M. Hoffmann, H. Kromer, R. Kuhn, Polymeranalytik I and II, Georg Thieme-Verlag, Stuttgart 1977).

Since, as is well known, the graft monomers are not necessarily completely grafted onto the graft base in the grafting reaction, graft polymers C are understood in accordance with the invention also to include products which also result from (co)polymerization of the graft monomers in the presence of the graft base and are among the products resulting from the workup. These products may accordingly also comprise free (co)polymer of the graft monomers, i.e. (co)polymer not chemically bonded to the rubber.

The graft base C.2 used is a silicone-acrylate composite rubber or a mixture of different silicone-acrylate composite rubbers. These silicone-acrylate composite rubbers are composite rubbers having graft-active sites, containing 20-60% by weight, preferably 25% to 50% by weight, of silicone rubber component C.2.1 and 85% to 40% by weight, preferably 75% to 50% by weight, of polyalkyl(meth)acrylate rubber component C.2.2, where there is interpenetration of these two rubber components in the composite rubber, such that they are essentially inseparable.

The particularly preferred proportions of silicone rubber and polyalkyl(meth)acrylate rubber result in a particularly advantageous combination of good mechanical properties, good surface of the component parts and good resistance toward hydrolytic molecular weight degradation and the influence of chemicals.

Silicone-acrylate composite rubbers are known and are described, for example, in U.S. Pat. No. 5,807,914, EP 430134 and U.S. Pat. No. 4,888,388.

Suitable silicone rubber components C.2.1 of the silicone-acrylate composite rubbers of C.2 are silicone rubbers having graft-active sites, the method of preparation of which is described, for example, in U.S. Pat. Nos. 2,891,920, 3,294,725, DE-A 3 631 540, EP 249964, EP 430134 and U.S. Pat. No. 4,888,388.

The silicone rubber of C.2.1 is preferably prepared by emulsion polymerization in which siloxane monomer units, crosslinking or branching agents (IV) and optionally grafting agents (V) are used.

Siloxane monomer units used, by way of example and with preference, are dimethylsiloxane or cyclic organosiloxanes having at least 3 ring members, preferably 3 to 6 ring members, by way of example and with preference hexamethylcyclotrisiloxane, octamethylcyclotetrasiloxane, decamethylcyclopentasiloxane, dodecamethylcyclohexasiloxane, trimethyltriphenylcyclotrisiloxanes, tetramethyltetraphenylcyclotetrasiloxanes, octaphenylcyclotetrasiloxane.

The organosiloxane monomers may be used alone or in the form of mixtures comprising 2 or more monomers.

Crosslinking or branching agents (IV) used are preferably silane-based crosslinking agents having a functionality of 3 or 4, more preferably 4. Preferred examples include: trimethoxymethylsilane, triethoxyphenylsilane, tetramethoxysilane, tetraethoxysilane, tetra-n-propoxysilane and tetrabutoxysilane. The crosslinking agent can be used alone or in a mixture of two or more. Particular preference is given to tetraethoxysilane.

Examples of grafting agents (V) include: β-methacryloyloxyethyldimethoxymethylsilane, γ-methacryloyloxypropylmethoxydimethylsilane, γ- methacryloyloxypropyldimethoxymethylsilane,
γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilanes or mixtures thereof.

It is preferable to use 0 to 20% by weight of grafting agent based on the total weight of the silicone rubber.

The silicone rubber may be prepared by emulsion polymerization as described, for example, in U.S. Pat. Nos. 2,891,920 and 3,294,725.

Suitable polyalkyl(meth)acrylate rubber components C.2.2 of the silicone-acrylate-composite rubbers may be prepared from alkyl methacrylates and/or alkyl acrylates, a crosslinking agent (VI) and a grafting agent (VII). Examples of preferred alkyl methacrylates and/or alkyl acrylates include the $C_1$- to $C_8$-alkyl esters, for example methyl, ethyl, n-butyl, t-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, and mixtures of these monomers. Particular preference is given to n-butyl acrylate.

Crosslinking agents (VI) used for the polyalkyl(meth)acrylate rubber component of the silicone-acrylate rubber may be monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or saturated polyols having 2 to 4 OH groups and 2 to 20 carbon atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Examples of preferred grafting agents (VII) include allyl methacrylate, triallyl cyanurate, triallyl isocyanurate or mixtures thereof. Allyl methacrylate may also be used as the crosslinking agent (VI). The grafting agents can be used alone or in mixtures of at least two grafting agents.

The amount of crosslinking agent (VI) and grafting agent (VII) is 0.1% to 20% by weight, based on the total weight of the polyalkyl(meth)acrylate rubber component of the silicone-acrylate rubber.

The silicone-acrylate composite rubber is prepared by first preparing the silicone rubber of C.2.1 in the form of an aqueous latex. This latex is then enriched with the alkyl methacrylates and/or alkyl acrylates to be used, the crosslinking agent (VI) and the grafting agent (VII) and a polymerization is performed.

The silicone-acrylate composite graft rubbers mentioned are prepared by grafting the monomers C.1 onto the rubber substrate C.2.

This can be done by employing the polymerization methods described, for example, in EP 249964, EP 430134 and U.S. Pat. No. 4,888,388.

The silicone-acrylate composite graft rubbers mentioned as component C are commercially available. One example is Metablen® S-2030 from Mitsubishi Rayon Co. Ltd.

Component D

Component D used is a phosphazene or a mixture of different phosphazenes. Phosphazenes are compounds of the formulae (IV) and (V)

(IV)

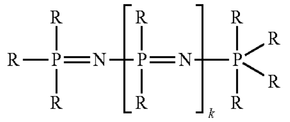

(V)

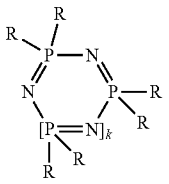

where

R in each case is the same or different and is
- an amine radical,
- in each case optionally halogenated, preferably fluorine-halogenated, more preferably monohalogenated, $C_1$- to $C_8$-alkyl, preferably methyl, ethyl, propyl or butyl,
- $C_1$- to $C_8$- alkoxy, preferably methoxy, ethoxy, propoxy or butoxy,
- in each case optionally alkyl-substituted, preferably $C_1$-$C_4$-alkyl-substituted, and/or halogen-substituted, preferably chlorine- and/or bromine-substituted, $C_5$- to $C_6$-cycloalkyl,
- in each case optionally alkyl-substituted, preferably $C_1$-$C_4$-alkyl-substituted, and/or halogen-substituted, preferably chlorine-, bromine-substituted, and/or hydroxyl-substituted, $C_6$- to $C_{20}$-aryloxy, preferably phenoxy, naphthyloxy,
- in each case optionally alkyl-substituted, preferably $C_1$-$C_4$-alkyl-substituted, and/or halogen-substituted, preferably chlorine- and/or bromine-substituted, $C_7$- to $C_{12}$-aralkyl, preferably phenyl-$C_1$-$C_4$-alkyl, or
- a halogen radical, preferably chlorine or fluorine, or
- an OH radical.

k is 0 or a number from 1 to 15, preferably a number from 1 to 10.

In the case where the phosphazene of formula (15a) or (15b) is halogen-substituted at the phosphorus, for example from incompletely reacted starting material, the proportion of this phosphazene halogen-substituted at the phosphorus is preferably less than 1000 ppm, more preferably less than 500 ppm.

In a further preferred embodiment, solely phosphazenes having the same R are used.

Preference is given to cyclic phosphazenes of formula (V); further preferred are propoxyphosphazene, phenoxyphosphazene, methylphenoxyphosphazene, aminophosphazene and fluoroalkylphosphazenes and also phosphazenes having the following structures:

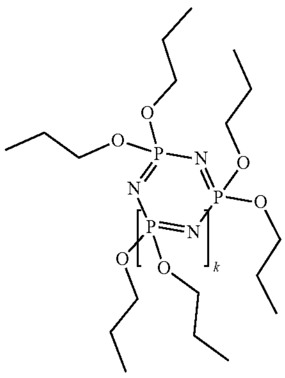

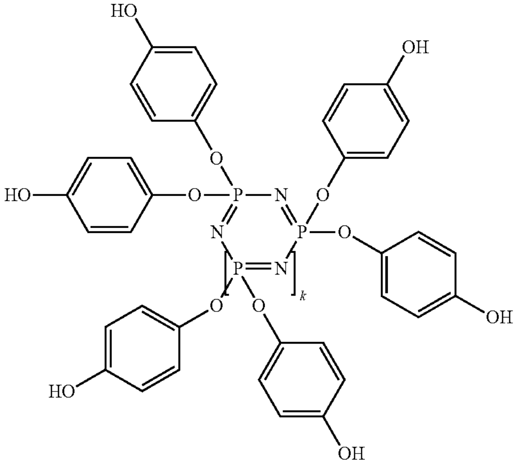

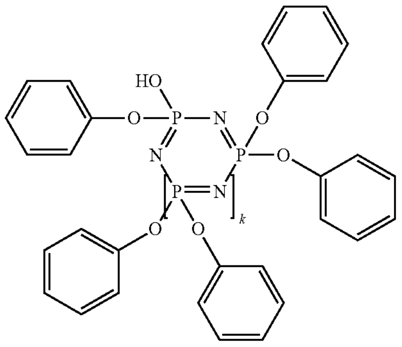

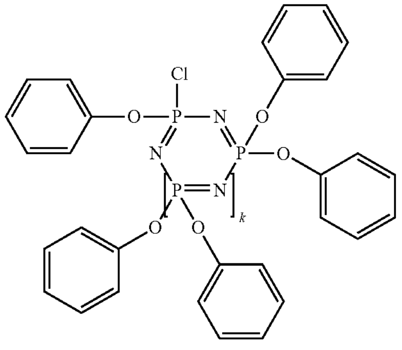

-continued

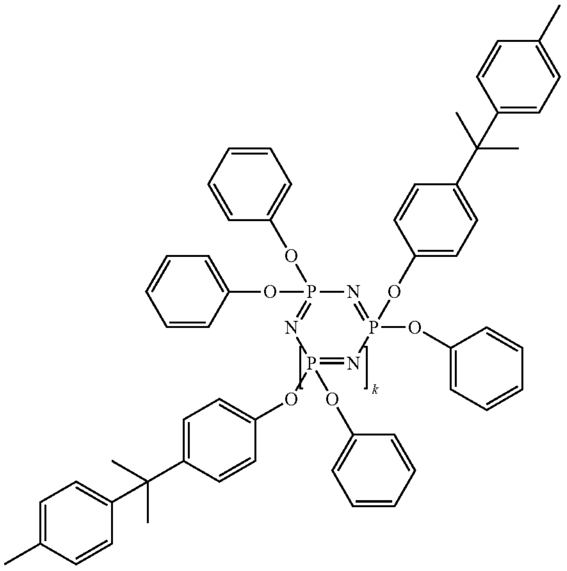

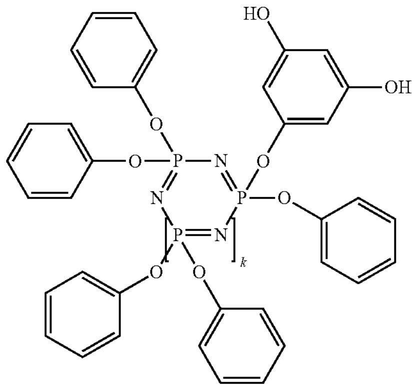

In the compounds shown above, k=1, 2 or 3.

Very particular preference is given to cyclic phenoxyphosphazene (all R=phenoxy) having a proportion of oligomers with k=1 (C1) of 60 to 98 mol %, more preferably 65 to 85 mol %, according to formula (IV).

(VI)

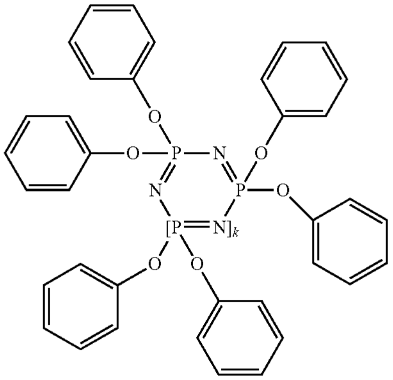

Component C is preferably a phenoxyphosphazene having a trimer fraction (k=1) of 65 to 85 mol %, a tetramer fraction (k=2) of 10 to 20 mol %, a fraction of higher oligomeric phosphazenes (k=3, 4, 5, 6 and 7) of 5 to 20 mol % and phosphazene oligomers with k>=8 of 0 to 2 mol % based on component C.

Phosphazenes and the preparation thereof are described in EP-A 728 811, DE-A 1 961668 and WO 97/40092 for example.

An example of a suitable phosphazene is Rabitle™ FP 110 (Fushimi, Japan).

The oligomer compositions of the phosphazenes in the respective blend samples can be detected and quantified even after compounding by $^{31}P$ NMR (chemical shift; δ trimer: 6.5 to 10.0 ppm; δ tetramer: −10 to −13.5 ppm; δ higher oligomers: −16.5 to −25.0 ppm).

Component E

As component E, the molding compound of the invention may comprise one or more polymer additives preferably selected from the group consisting of anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, further polymeric constituents other than components A, B and C (for example functional blend partners), fillers and reinforcers, and dyes and pigments.

In a preferred embodiment, the molding compound does not contain any fillers and reinforcers.

In a preferred embodiment, the molding compound contains at least one polymer additive selected from the group consisting of lubricants and demolding agents, stabilizers, anti-drip agents, flow promoters, phase compatibilizers, other polymeric constituents, dyes and pigments.

In a preferred embodiment, the molding compound contains pentaerythritol tetrastearate as demolding agent.

In a preferred embodiment, the molding compound contains, as stabilizer, at least one representative selected from the group consisting of sterically hindered phenols, phosphoric acids, organic phosphite s and sulfur-based co-stabilizers.

In a particularly preferred embodiment, the molding compound contains, as component E, at least one representative selected from the group consisting of lubricants and demolding agents, stabilizers and dyes and pigments and is free from other polymer additives of component E.

Production of the Molding Compounds and Molded Articles

The thermoplastic molding compounds can be produced, for example, by mixing the respective constituents in a known manner and melt-compounding and melt-extruding the mixture at temperatures of preferably 200° C. to 320° C., more preferably at 220° C. to 290° C., most preferably at 230° C. to 270° C., in customary apparatuses such as internal kneaders, extruders and twin-screw extruders for example. This process is generally referred to in the context of the present application as compounding.

The term “molding compound” is understood to mean the product obtained when the respective components are melt-compounded and melt-extruded.

The individual constituents of the molding compounds can be mixed in a known manner, either successively or simultaneously, either at about 20° C. (room temperature) or at higher temperature. This means that, for example, some of the constituents may be introduced via the main intake of an extruder and the remaining constituents may be introduced later in the compounding process via a side extruder.

The molding compounds of the invention may be used to produce molded articles of any kind. These may be produced by injection molding, extrusion and blow molding processes for example. A further form of processing is the production of molded articles by thermoforming from previously produced sheets or films. The molding compounds of the invention are particularly suitable for processing by injection molding, extrusion, blow molding and thermoforming methods. Most preferred is the injection molding method.

It is also possible to meter the constituents of the molding compound directly into an injection molding machine or into an extrusion unit and to process them to give molded articles.

Examples of such molded articles that are producible from the molding compound of the invention are films, profiles, housing parts of any kind, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (interior fitout and exterior applications) and also electrical and electronic components such as switches, plugs and sockets, and parts for commercial vehicles, in particular for the automotive sector. The compositions and molding compounds of the invention are also suitable for producing the following molded articles or moldings: interior fitout parts for rail vehicles, ships, aircraft, buses and other motor vehicles, bodywork components for motor vehicles, housings of electrical equipment containing small transformers, housings for equipment for the processing and transmission of information, massage equipment and housings therefor, toy vehicles for children, two-dimensional wall elements, housings for safety equipment, thermally insulated transport containers, molded parts for sanitation and bath equipment, protective grilles for ventilation openings and housings for garden equipment. The molding compounds of the invention are particularly suitable for production of housings and facings for medical equipment.

EXAMPLES

Component A

Linear polycarbonate based on bisphenol A and having a weight-average molecular weight $M_w$ of 31 000 g/mol (determined by GPC in methylene chloride with polycarbonate based on bisphenol A as standard).

Component B-1

Polybutylene terephthalate having a melt flow rate (MFR) of 12.0 g/10 min, measured to DIN EN ISO 1133 (2012 version) at 250° C. and load 2.16 kg.

Component B-2

Polybutylene terephthalate having a melt flow rate (MFR) of 49.0 g/10 min, measured to DIN EN ISO 1133 (2012 version) at 250° C. and load 2.16 kg.

Component B-3

Polyethylene terephthalate (PET) having an intrinsic viscosity of 0.87 dl/g, measured in dichloroacetic acid in a concentration of 1% by weight at 25° C.

Component C-1

Graft polymer composed of 14% by weight of methyl methacrylate onto 86% by weight of a silicone-acrylate composite rubber as graft base, where the silicone-acrylate composite rubber contains 36% by weight of silicone rubber and 64% by weight of polyalkyl(meth)acrylate rubber and where there is interpenetration of the two rubber components mentioned in the composite rubber, such that they are essentially inseparable.

Component C-2

Graft polymer prepared by reaction of 11% by weight of methyl methacrylate onto 89% by weight of a silicone-acrylate composite rubber as graft base, wherein the silicone-acrylate composite rubber contains 92% by weight of silicone rubber and 8% by weight of polyalkyl(meth)acrylate rubber and where there is interpenetration of the two rubber components mentioned in the composite rubber, such that they are essentially inseparable.

Component C-3

Graft polymer composed of 17% by weight of methyl methacrylate onto 83% by weight of a silicone-acrylate composite rubber as graft base, where the silicone-acrylate composite rubber contains 11% by weight of silicone rubber and 89% by weight of polyalkyl(meth)acrylate rubber and where there is interpenetration of the two rubber components mentioned in the composite rubber, such that they are essentially inseparable.

Component C-4

Graft polymer composed of 23% by weight of methyl methacrylate and 6% by weight of styrene onto 71% by weight of butadiene rubber as graft base.

Component D

Phenoxyphosphazene of the formula (VI) having a fraction of oligomers where k=1 of 70 mol %, a proportion of fraction where k=2 of 18 mol % and a fraction of oligomers where k>3 of 12 mol %.

(VI)

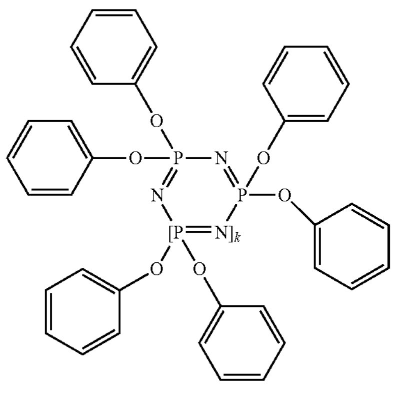

Component E-1

Cycolac™ INP449: polytetrafluoroethylene (PTFE) preparation from Sabic, composed of 50% by weight of PTFE present in an SAN copolymer matrix.

Component E-2

Irganox™ 1010 (pentaerythritol tetrakis(3,5-di-tert-butyl-4-hydroxyhydrocinnamate); BASF (Ludwigshafen, Germany)

Component E-3

Irgafox™ 168 (tris(2,4-di-tert-butylphenyl) phosphite); BASF (Ludwigshafen, Germany)

Component E-4 phosphorous acid, $H_3PO_3$, Sigma-Aldrich Chemie GmbH, Germany

Component E-5 pentaerythritol tetrastearate as demolding agent, Cognis Oleochemicals GmbH, Germany Production and Testing of the Molding Compounds of the Invention The components were mixed in a Werner & Pfleiderer ZSK-25 twin-screw extruder at a melt temperature of 260-280° C. The molded articles were produced at a melt temperature of 260° C. (or at 270° C. in the case of V22 owing to the higher melting temperature of PET) and a mold temperature of 70° C. on an Arburg 270 E injection molding machine.

Tensile modulus of elasticity was determined to ISO 527 (1996 version) at room temperature.

IZOD notched impact resistance was determined at room temperature on test specimens of dimensions 80 mm×10 mm×4 mm to ISO 180-A (1982 version).

Impact resistance was determined at room temperature on test specimens of dimensions 80 mm×10 mm×4 mm to ISO 180-U (1982 version).

Melt viscosity as a measure of melt flowability was determined to ISO 11443 (2014 version) at a temperature of 260° C. and a shear rate of 1000 $s^{-1}$. In the case of V22, measurement was effected at 270° C. owing to the higher melting temperature of PET.

Melt volume flow rate (MVR) was measured to ISO 1133 (2012 version) at a temperature of 260° C. (or at 270° C. in the case of V22) and a load of 5 kg.

Flame retardancy was assessed to UL94V on specimens of dimensions 127×12.7×2.4 mm A measure used for chemical stability was stress cracking (ESC) resistance in various media at room temperature. What was determined was the time taken for stress-induced failure resulting from the occurrence of edge cracks or complete fracture on a test specimen of dimensions 80 mm×10 mm×4 mm that had been injection-molded at melt temperature 260° C. (or 270° C. in the case of V22), which was subjected to an external outer fiber strain 1.2% or 2.4% by means of a clamping template and completely immersed in the liquid. Measurement was in accordance with ISO 22088 (2006 version). Media used were rapeseed oil and the detergents Cidex™ OPA (Johnson & Johnson Medical Ltd., UK) and Hexaquart™plus (BBraun, Germany). The maximum test duration is 168 h. If no edge cracks or fracture of the test specimen have been observed within this period, the test is considered to have been passed (resistant).

Cidex™ OPA is a detergent and disinfectant which is used particularly for the cleaning of medical equipment and instruments. The active ingredient of Cidex™ OPA is ortho-phthalaldehyde in a concentration of 0.55%.

Hexaquart™ plus is a concentrate for cleaning and disinfection of surfaces in the medical sector. Active ingredients of the detergent are didecyldimethylammonium chloride (6.0 g per 100 g) and N-(3-aminopropyl)-N-dodecylpropane-1,3-diamine (5.5 g per 100 g). A solution having the manufacturer's recommended concentration of 2% by volume in water was produced from the concentrate and used as test medium.

TABLE 1

Compositions of the inventive molding compounds and their properties

| | 1 | 2 | 3 | 4 | 5 | 6 |
|---|---|---|---|---|---|---|
| Components [% by weight] | | | | | | |
| A | 52.90 | 50.95 | 60.90 | 52.90 | 54.20 | 49.65 |
| B-1 | 28.48 | 27.43 | 20.48 | 28.48 | 29.18 | 26.73 |
| C-1 | 5.00 | 8.00 | 5.00 | 5.00 | 5.00 | 8.00 |
| D | 12.00 | 12.00 | 12.00 | 12.00 | 10.00 | 14.00 |
| E-1 | 0.80 | 0.80 | 0.80 | 0.80 | 0.80 | 0.80 |
| E-2 | 0.10 | 0.10 | 0.10 | 0.10 | 0.10 | 0.10 |
| E-3 | 0.10 | 0.10 | 0.10 | 0.10 | 0.10 | 0.10 |
| E-4 | 0.02 | 0.02 | 0.02 | 0.02 | 0.02 | 0.02 |
| E-5 | 0.60 | 0.60 | 0.60 | 0.60 | 0.60 | 0.60 |
| D/C ratio | 2.4 | 1.5 | 2.4 | 2.4 | 2.0 | 1.75 |
| Properties | | | | | | |
| MVR [$cm^3$/10 min] | 32 | 28 | 31 | 31 | 28 | 34 |
| Melt viscosity [Pas] | 256 | 253 | 273 | 255 | 280 | 227 |
| Tensile modulus of elasticity [MPa] | 2337 | 2171 | 2360 | 2337 | 2338 | 2172 |
| Izod impact resistance [kJ/$m^2$] | n.f. | n.f. | n.f. | n.f. | n.f. | n.f. |
| Izod notched impact resistance [kJ/$m^2$] | 46 | 61 | 52 | 49 | 51 | 58 |
| UL94-V (2.4 mm) | V-0 | V-0 | V-0 | V-0 | V-0 | V-0 |
| ESC resistance | | | | | | |
| rapeseed oil, 2.4% OFS | resistant | | | | | |
| Cidex ™ OPA, 2.4% OFS | resistant | | | | | |
| Hexaquart ™ plus, 1.2% OFS | resistant | | | | | |

*n.f.: no fracture

TABLE 2

Compositions of the noninventive molding compounds and their properties

| | V7 | V8 | V9 | V10 | V11 | V12 |
|---|---|---|---|---|---|---|
| Components [% by weight] | | | | | | |
| A | 52.90 | 50.95 | 52.90 | 50.95 | 52.90 | 50.95 |
| B-1 | 28.48 | 27.43 | 28.48 | 27.43 | 28.48 | 27.43 |
| C-2 | 5.00 | 8.00 | | | | |
| C-3 | | | 5.00 | 8.00 | | |
| C-4 | | | | | 5.00 | 8.00 |
| D | 12.00 | 12.00 | 12.00 | 12.00 | 12.00 | 12.00 |
| E-1 | 0.80 | 0.80 | 0.80 | 0.80 | 0.80 | 0.80 |
| E-2 | 0.10 | 0.10 | 0.10 | 0.10 | 0.10 | 0.10 |
| E-3 | 0.10 | 0.10 | 0.10 | 0.10 | 0.10 | 0.10 |
| E-4 | 0.02 | 0.02 | 0.02 | 0.02 | 0.02 | 0.02 |
| E-5 | 0.60 | 0.60 | 0.60 | 0.60 | 0.60 | 0.60 |
| D/C ratio | 2.4 | 1.5 | 2.4 | 2.4 | 2.4 | 1.5 |
| Properties | | | | | | |
| MVR [$cm^3$/10 min] | 29 | 25 | 28 | 26 | 28 | 25 |
| Melt viscosity [Pas] | 253 | 250 | 269 | 261 | 277 | 272 |
| Tensile modulus of elasticity [MPa] | 2411 | 2263 | 2420 | 2249 | 2352 | 2226 |
| Izod impact resistance [kJ/$m^2$] | n.f. | n.f. | n.f. | n.f. | n.f. | n.f. |
| Izod notched impact resistance [kJ/$m^2$] | 13 | 58 | 31 | 63 | 11 | 36 |
| UL94-V (2.4 mm) | V-NOT | V-1 | V-NOT | V-NOT | V-NOT | V-NOT |

n.f.: no fracture

V-NOT: no UL classification, failed

TABLE 3

| Compositions of the noninventive molding compounds and their properties | | | | | | | |
|---|---|---|---|---|---|---|---|
| | V13 | V14 | V15 | V16 | V17 | V18 | V19 |
| Components [% by weight] | | | | | | | |
| A | 49.00 | 52.25 | 51.60 | 56.77 | 48.90 | 40.90 | 65.025 |
| B-1 | 26.38 | 28.13 | 27.78 | 30.57 | 32.48 | 40.48 | 16.260 |
| C-1 | 11.00 | 8.00 | 5.00 | 5.00 | 5.00 | 5.00 | 5.00 |
| D | 12.00 | 10.00 | 14.00 | 6.00 | 12.00 | 12.00 | 12.00 |
| E-1 | 0.80 | 0.80 | 0.80 | 0.80 | 0.80 | 0.80 | 0.80 |
| E-2 | 0.10 | 0.10 | 0.10 | 0.15 | 0.10 | 0.10 | 0.20 |
| E-3 | 0.10 | 0.10 | 0.10 | 0.10 | 0.10 | 0.10 | 0.10 |
| E-4 | 0.02 | 0.02 | 0.02 | 0.01 | 0.02 | 0.02 | 0.015 |
| E-5 | 0.60 | 0.60 | 0.60 | 0.60 | 0.60 | 0.60 | 0.60 |
| D/C ratio | 1.09 | 1.25 | 2.8 | 1.2 | 2.4 | 2.4 | 2.4 |
| Properties | | | | | | | |
| MVR [$cm^3$/10 min] | 25 | 24 | 37 | 22 | 34 | 33 | 31 |
| Melt viscosity [Pas] | 248 | 277 | 227 | 338 | 238 | 239 | 291 |
| Tensile modulus of elasticity [MPa] | 2045 | 2199 | 2323 | 2377 | 2362 | 2347 | 2278 |
| Izod impact resistance [kJ/$m^2$] | n.f. | n.f. | n.f. | n.f. | n.f. | n.f. | n.f. |
| Izod notched impact resistance [kJ/$m^2$] | 60 | 62 | 17 | 58 | 14 | 12 | 68 |
| UL94-V (2.4 mm) | V-1 | V-NOT | V-1 | V-1 | V-0 | V-0 | V-0 |
| ESC resistance | | | | | | | |
| rapeseed oil, 2.4% OFS | | | | | | | resistant |
| Cidex ™ OPA, 2.4% OFS | | | | | | | resistant |
| Hexaquart ™ plus, 1.2% OFS | | | | | | | edge cracks after 118.5 h |

n.f.: no fracture
V-NOT: no UL classification, failed

TABLE 4

| Compositions of the noninventive molding compounds and their properties | | | |
|---|---|---|---|
| | V20 | V21 | V22 |
| Components [% by weight] | | | |
| A | 52.90 | 52.90 | 52.81 |
| B-1 | 18.98 | | |
| B-2 | 9.50 | 28.48 | |
| B-3 | | | 28.48 |
| C-1 | 5.00 | 5.00 | 5.00 |
| D | 12.00 | 12.00 | 12.00 |
| E-1 | 0.80 | 0.80 | 0.80 |
| E-2 | 0.10 | 0.10 | 0.20 |
| E-3 | 0.10 | 0.10 | 0.10 |
| E-4 | 0.02 | 0.02 | 0.02 |
| E-5 | 0.60 | 0.60 | 0.60 |
| D/C ratio | 2.4 | 2.4 | 2.4 |
| Properties | | | |
| MVR [$cm^3$/10 min] | 41 | 48 | 48 (270° C.) |
| Melt viscosity [Pas] | 224 | 200 | 132 (270° C.) |
| Tensile modulus of elasticity [MPa] | 2335 | 2354 | 2383 |
| Izod impact resistance [kJ/$m^2$] | n.f. | n.f. | n.f. |
| Izod notched impact resistance [kJ/$m^2$] | 13 | 15 | 24 |
| UL94-V (2.4 mm) | V-0 | V-0 | V-0 |
| ESC resistance | | | |
| rapeseed oil, 2.4% OFS | | | resistant |
| Cidex ™ OPA, 2.4% OFS | | | resistant |
| Hexaquart ™ plus, 1.2% OFS | | | fracture at <168 h |

n.f.: no fracture

The data from tables 1 to 4 show that only the inventive molding compounds have the desired property profile of mechanical properties, especially impact resistance and notched impact resistance, flowability and flame retardancy. Molding compounds 1, 3, 4 and 5 additionally show the preferably desired stiffness.

If a noninventive graft polymer is used (V7 to V12), flame retardancy and in some cases also toughness are not at the required level.

If the weight ratio of components D to C is not within the claimed range (V13 to V16), flame retardancy is likewise inadequate. Moreover, in the case of too high a ratio, toughness is limited.

If the proportion of component B is too high, toughness is distinctly limited (V17 and V18). By contrast, if the proportion is too low, resistance to detergents is limited, i.e. there is not resistance against all detergents.

It is also disadvantageous when component B has excessive flowability (V20 and V21) or when a polyethylene terephthalate is used rather than polybutylene terephthalate (V22).

The invention claimed is:

1. A thermoplastic molding compound consisting of

A) 45% to 65% by weight of at least one of an aromatic polycarbonate, polyestercarbonate, and mixtures thereof, B) 18% by weight to 31% by weight of at least one polybutylene terephthalate having a flowability of 5 g/10 min to 30 g/10 min to DIN EN ISO 1133 at measurement temperature 250° C. and a load of 2.16 kg, wherein the polybutylene terephthalate comprises structural units derived from terephthalic acid and butane-1,4-diol and from no other acid or diol C) 3% to 10% by weight of at least one rubber-modified graft polymer having a graft base comprising a silicone-acrylate composite rubber and a silicone rubber content of 20% to 60% by weight based on the graft base, D) 8% to 13% by weight of at least one phosphazene, E) 0% to 8.0% by weight of at least one polymer additive selected from the group consisting of lubricants and demolding agents, antistats, conductivity additives, stabilizers, anti-drip agents, flame retardant synergists, smoke inhibitors, dyes and pigments, wherein the weight ratio of components D) to C) is from 1.3:1 to 2.5:1.

2. The molding compound as claimed in claim 1, characterized in that component C is a graft polymer comprising C.1 8% to 20% by weight, based on component C, of at least one vinyl monomer onto C.2 92% to 80% by weight based on component C of a graft base composed of silicone-acrylate composite rubber.

3. The molding compound as claimed in claim 2, characterized in that C.1 is methyl methacrylate.

4. The molding compound as claimed in claim 1, characterized in that the graft base of component C includes a silicone rubber content of 25% to 50% by weight, based on the graft base.

5. The molding compound as claimed in claim 1, characterized in that the weight ratio of component D to component C is 2:1 to 2.5:1.

6. The molding compound as claimed in claim 1, wherein

Component A is a linear aromatic polycarbonate based on bisphenol A,

Component B is a polybutylene terephthalate comprising structural units derived from terephthalic acid and butane-1,4-diol and from no other acid or diol, Component D is a cyclic phenoxyphosphazene of formula (V)

(V)

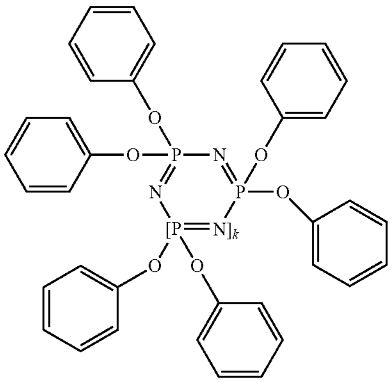

where k is an integer from 1 to 10.

7. The molding compound as claimed in claim 1, exhibiting a flame retardancy rating of UL 94 V-0 at 2.4 mm thickness in combination with Izod notched impact resistance of at least 35 kJ/m2 at room temperature.

8. The molding compound as claimed in claim 1, wherein

Component A is a linear aromatic polycarbonate based on bisphenol A,

Component D is a cyclic phenoxyphosphazene of formula (V)

(V)

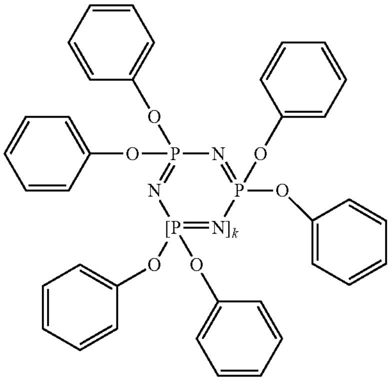

where k is an integer from 1 to 10,

Component E is selected from the group consisting of lubricants and demolding agents, stabilizers, anti-drip agents, dyes and pigments.

9. A molded article comprising a molding compound as claimed in claim 1.

* * * * *